UNITED STATES PATENT OFFICE.

CARL F. KRIEWS, OF CLEVELAND, OHIO, ASSIGNOR OF ONE-HALF TO FRANK C. KRIEWS, OF CLEVELAND, OHIO.

FLUX FOR SOLDERING ALUMINUM.

1,208,799. Specification of Letters Patent. Patented Dec. 19, 1916.

No Drawing. Application filed April 21, 1916. Serial No. 92,657.

*To all whom it may concern:*

Be it known that I, CARL F. KRIEWS, a citizen of the United States, resident of Cleveland, county of Cuyahoga, and State of Ohio, have invented a new and useful Improvement in Fluxes for Soldering Aluminum, of which the following is a specification, the principle of the invention being herein explained, and the best mode in which I have contemplated applying that principle, so as to distinguish it from other inventions.

My invention relates to fluxes for securing solder to aluminum, and especially to fluxes whereby the ordinary solder of commerce may be used for such soldering, the object of the invention being to provide simple, economical and efficient means for effecting a permanent union between the solder and the aluminum and thereby effect a permanent joint between two aluminum elements or between one element consisting of aluminum and another element of any other metal.

The said invention consists of means hereinafter fully described and particularly set forth in the claim.

As is well known to those skilled in the art, great difficulty has been met in soldering aluminum in an efficient, economical and permanent manner and especially in a manner whereby aluminum may be soldered readily in such instances as occur in the practice of ordinary mechanical arts in which aluminum is used for structural purposes.

I have found that the ordinary solder of commerce may be readily and securely fixed to an aluminum surface by using free fatty acid of the kind obtainable from animal fats, such as palmitic, stearic, or oleic acid as a flux, using an ordinary soldering iron in the manner heretofore employed in the well-known and common practice of soldering tin for example.

In applying this flux I find it desirable to first scrape or otherwise abrade the aluminum surface to which the solder is to be applied, and then apply the free fatty acid to such surface. An ordinary soldering iron is then heated and applied to a stick of ordinary commercial solder, which consists usually of an alloy of one-eighth of tin and seven-eighths of lead, the soldering iron being heated, as is usual, to a temperature of 375° to 450° F. Where a comparatively large surface or seam is to be soldered, I find it advantageous to preheat the adjoining surfaces slightly before applying the flux and solder.

By means of the above-described flux, I have found that such ordinary solder may be securely and permanently attached to an aluminum surface and that such solder hence may be successfully used in joining together two aluminum elements. I have also found that certain substances which are derived from, are compositions of or mixtures with these free fatty acids, may also accomplish the hereindescribed purpose to a more or less satisfactory degree, as for instance, olive oil, cottonseed oil or linseed oil, which are glycerids of a fatty acid. This form of my invention I have claimed in a separate application for U. S. Letters Patent, filed February 10, 1916, Serial No. 77,367.

Having fully described my invention, what I claim and desire to secure by Letters Patent is:—

A flux for soldering aluminum comprising a fatty acid such as oleic, palmitic, stearic, obtainable from animal fats.

Signed by me, this 19th day of April, 1916.

CARL F. KRIEWS.